(12) United States Patent
Golden

(10) Patent No.: US 7,942,936 B2
(45) Date of Patent: May 17, 2011

(54) ELECTRONIC SYSTEM LOCATION DETERMINATION

(75) Inventor: Stuart A Golden, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 892 days.

(21) Appl. No.: 11/527,799

(22) Filed: Sep. 27, 2006

(65) Prior Publication Data
US 2008/0091939 A1    Apr. 17, 2008

(51) Int. Cl.
*G08B 13/00* (2006.01)
*G08B 1/08* (2006.01)
*H04W 24/00* (2009.01)

(52) U.S. Cl. .......... 726/35; 340/539.13; 455/456.1; 455/456.2; 455/456.6

(58) Field of Classification Search .......... 726/35; 455/456.1, 456.2, 456.6; 340/539.13
See application file for complete search history.

(56) References Cited

U.S. PATENT DOCUMENTS

| | | | | |
|---|---|---|---|---|
| 5,459,713 A * | 10/1995 | Curtis | | 370/255 |
| 6,833,787 B1 * | 12/2004 | Levi | | 340/539.13 |
| 7,035,648 B2 | 4/2006 | Czaja et al. | | |
| 2002/0164952 A1 * | 11/2002 | Singhal et al. | | 455/41 |
| 2002/0194500 A1 * | 12/2002 | Bajikar | | 713/201 |
| 2003/0018704 A1 * | 1/2003 | Polychronidis et al. | | 709/202 |
| 2003/0100314 A1 | 5/2003 | Czaja et al. | | |
| 2004/0087316 A1 | 5/2004 | Caci | | |
| 2004/0152471 A1 | 8/2004 | MacDonald et al. | | |
| 2004/0162875 A1 * | 8/2004 | Brown | | 709/203 |
| 2004/0198309 A1 * | 10/2004 | Duvall | | 455/404.1 |
| 2004/0225876 A1 * | 11/2004 | Lam | | 713/2 |
| 2005/0070306 A1 | 3/2005 | Kim et al. | | |
| 2006/0245406 A1 * | 11/2006 | Shim | | 370/338 |
| 2007/0013584 A1 | 1/2007 | Camp, Jr. | | |
| 2007/0076674 A1 | 4/2007 | Golden et al. | | |
| 2007/0082671 A1 * | 4/2007 | Feng et al. | | 455/436 |

OTHER PUBLICATIONS

Emily Qi, "Status of Project IEEE 802.11v", IEEE802.org,http://www.ieee802.org/11/Reports/tgv_update.htm,downloaded on Aug. 19, 2009 1:58:07 PM, pp. 1-42.*
Donghee Shim and Dorothy Stanley, Normative Text Comment Resolution for CID139 and 140, Jan. 2007, pp. 2-3.*
Joanie Wexler, Net mgmt. to gain Wi-Fi's attention, Network World, Jan. 12, 2005, downloaded on Aug. 19, 2009 3:53:51 PM, p. 1.*

* cited by examiner

*Primary Examiner* — Kambiz Zand
*Assistant Examiner* — Michael Guirguis
(74) *Attorney, Agent, or Firm* — Cool Patent, P.C.; Joseph P. Curtin

(57) ABSTRACT

A lost or stolen computing device is recovered. A trusted server is requested to locate the computing device. The trusted server requests coarse location information from the computing device, and the computing device reports its coarse location. The trusted server then requests that the computing device transmit wireless local area networks signal so that it may be recovered.

17 Claims, 5 Drawing Sheets

ELECTRONIC SYSTEM LOCATION DETERMINATION

FIELD

The present invention relates generally to loss or theft recovery of computers, and more specifically to location determination.

BACKGROUND

Computing devices may be lost or stolen. A computing device may have sensitive information stored thereon that makes recovery of the lost or stolen device an important consideration. That is, the recovery of the device can be used to determine if the device has been compromised. Also, the recovery of the device is important since the notebook can be expensive. Current mechanisms for location determination may lack the necessary precision to recover the computing device.

DESCRIPTION OF EMBODIMENTS

Figure 1:
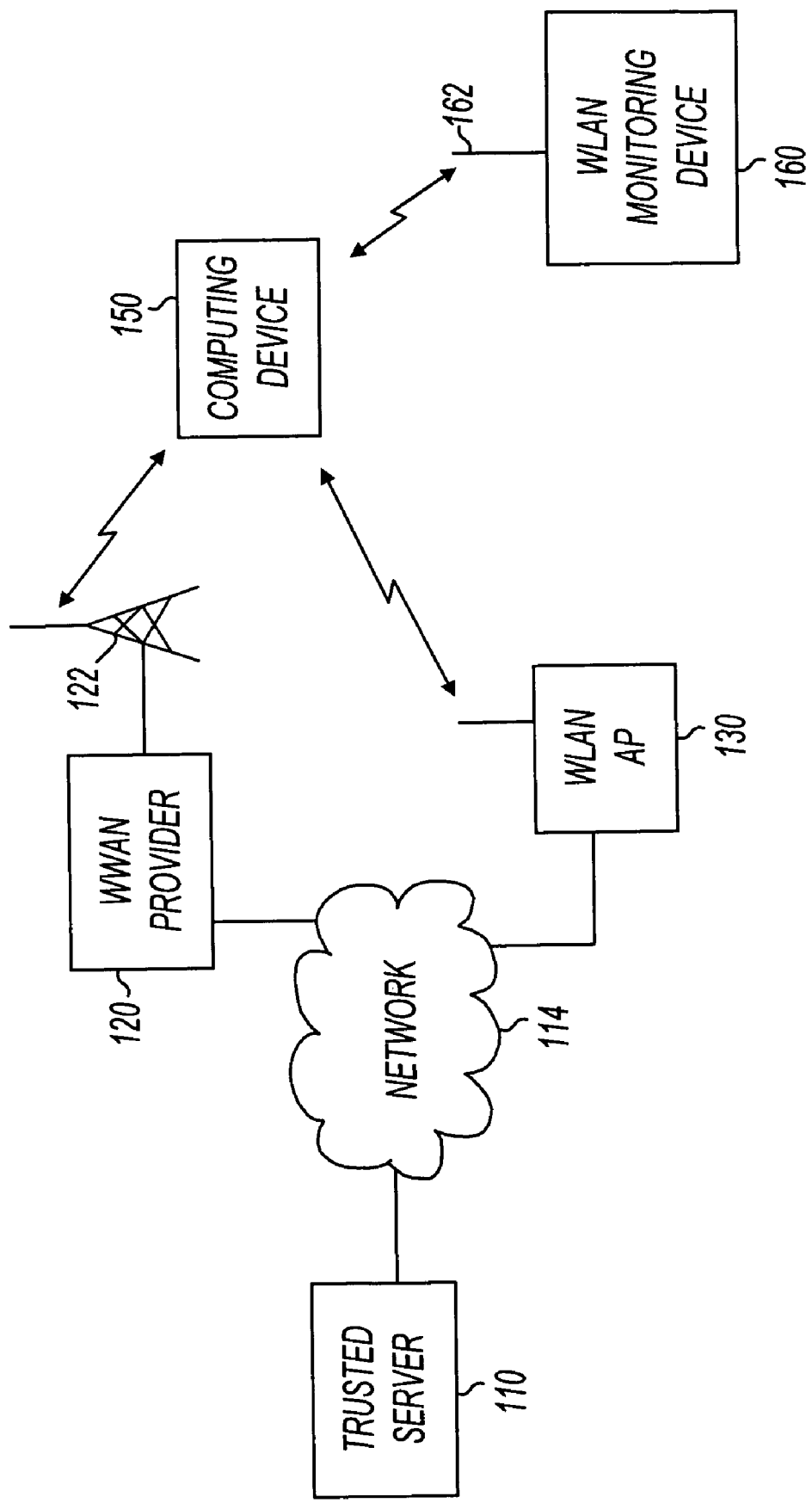
FIG. 1 shows a computing device in communication with multiple other devices.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a computing device in communication with multiple other devices. FIG. 1 includes trusted server 110, network 114, WWAN provider 120, WWAN antenna site 122, WLAN access point (AP) 130, computing device 150, and WLAN monitoring device 160.

Computing device 150 represents a computing device that is to be located. For example, computing device 150 may have been lost, stolen, or misplaced. Computing device 150 may be any type of computing device, including a laptop computer, a handheld computer, or any other type of computing device capable of operating as described herein. Computing device 150 is associated with an "owner." The owner is a person or entity that desires to locate computing device 150. For example, the owner may be an individual or a business entity that has lost computing device 150.

Computing device 150 includes the ability to communicate over both a WWAN and a WLAN. For example, computing device 150 may include hardware to communicate over a WWAN (Wireless Wide Area Network) radio. Examples of WWAN radios include third generation (3G) cellular telephone network radios such as CDMA (Code Division Multiple Access) 2000, WCDMA (Wideband CDMA), or WiMAX. These different communication protocols are specified in standard bodies such as WiMAX is specified in the IEEE 802.16d and e working groups. Further, computing device 150 may include hardware to communicate over a network in compliance with a WLAN (Wireless Local Area Network) standard, such as an IEEE 802.11 standard. Various embodiments of computing devices are described more fully below.

Trusted server 110 is a server trusted by the owner and also trusted by computing device 150. For example, when an owner first purchases computing device 150, the owner may register with the trusted server. Trusted server 110 provides location determination services in the event that computing device 150 needs to be located. For example, when an owner needs to locate computing device 150, the owner may contact trusted server 110, and report the loss or theft of computing device 150.

WWAN provider 120 may be any provider capable of providing networking services over a wide area. For example, WWAN 120 may be a cellular telephone provider or a provider of networking services in compliance with a standard, such as WiMAX. WWAN provider 120 provides services using antenna site 122. Antenna site 122 may be one of many antenna sites through which WWAN provider 120 may provide services. For example, antenna sites may be organized in a grid or in "cells" that allow computing device 150 to communicate with more than one antenna site.

WWAN 120 is coupled to trusted server 110 through network 114. Network 114 may be any network capable of providing connectivity between the various elements shown in FIG. 1. For example, network 114 may be a wired network, a wireless network, or a combination of the two. Further, network 114 may include the Internet, satellite networks, or the like.

As described more fully below, coarse location determination services may be provided to trusted server 110 by WWAN provider 120. Trusted server 110 may request WWAN provider 120 to provide information describing the location of computing device 150, and WWAN provider 120 may provide that information with various amounts of precision. Further, coarse location may be provided by the computing device 150 or a combination of the computing device and WWAN provider. For example, computing device 150 may have a GPS (Global Positioning System) receiver or AGPS (Assisted GPS) receiver built into the computing device. Other GPS-like receivers include GOLONASS and Galileo. In some embodiments, an AGPS receiver may cooperate with the WWAN provider to determine coarse location. In some embodiments, a WWAN provider may perform triangulation to determine coarse location. For example, a GSM (Global System for Mobile communication) WWAN may perform triangulation between cell towers based on signal strength measurements.

WLAN access point (AP) 130 may be any access point that provides connectivity to a wireless local area network. For example, access point 130 may operate in compliance with a wireless network standard such as IEEE Std. 802.11, 1999 Edition, although this is not a limitation of the present invention. As used herein, the term "802.11" refers to any past, present, or future IEEE 802.11 standard, or extension thereto, including, but not limited to, the 1999 edition. Further, WLAN AP 130 may operate in compliance with IEEE 802.11v, and may provide "presence request" frames, to computing device 150. In response, computing device 150 may provide "presence response" frames to announce its presence. Presence request and presence response frames refer to a specific protocol for the AP 130 and computing device 150 to communicate. Although other protocols can be used for this purpose, this one was designed for WAN based location.

WLAN AP 130 may stand alone or may be part of a larger local area network. For example, WLAN AP 130 may be one of may access points in an "infrastructure" network on a corporate campus, or may be a single access point in a hotel or a residence. WLAN AP 130 communicates with trusted server 110 over network 114. After trusted server 110 has knowledge of the coarse location of computing device 150, trusted server 110 attempts to communicate with computing device 150 using WLAN AP 130. Trusted server 110 may select WLAN AP 130 from a large list of access points based at least in part on the coarse location of computing device 150.

WLAN monitoring device 160 is a device that is able to monitor wireless local area network signals. WLAN monitoring device 160 receives WLAN signals using antenna 162, and processes them accordingly. In some embodiments, antenna 162 is a directional antenna (for example, a beam-forming antenna made up of multiple antenna elements) capable of determining a direction from which signals are received. Further, in some embodiments, WLAN monitoring device 160 may include hardware and/or software to allow a "range" computation to determine a distance between WLAN monitoring device 160 and computing device 150.

In operation, the various components of FIG. 1 may be utilized to determine the location of computing device 150. For example, computing device 150 may be reported lost or stolen, and the various components of FIG. 1 may be used to recover computing device 150. In a typical usage scenario, the owner of computing device 150 may report it lost or stolen, and trusted server 110 may then be alerted that computing device 150 is missing. Trusted server 110 contacts computing device 150 through WWAN provider 120 to determine the coarse location of computing device 150. For example, in some embodiments, WWAN provider 120 is a cellular telephone provider and trusted server 110 contacts computing device 150 over the cellular network. Also, for example, in some embodiments WWAN provider 120 is WiMAX compatible, and trusted server 110 contacts computing device 150 over the WiMAX network.

Computing device 150 responds to trusted server 110 by providing its coarse location. The coarse location information may be determined (computed) by computing device 150 or may be provided to computing device 150 by a different component. For example, in some embodiments, computing device 150 may have a global positioning system (GPS) receiver, and the location of computing device 150 may be determined using the GPS receiver. Also, for example, computing device 150 may request its coarse location from WWAN provider 120, and WWAN provider 120 may provide location information to computing device 150. WWAN provider 120 may determine the coarse location of computing device 150 in any manner, including but not limited to the location of antenna site 122. In some embodiments, multiple antenna sites 122 may communicate with computing device 150, and the coarse location may be determined using information from more than one antenna site.

In some embodiments, the location of WLAN AP 130 may provide coarse location information. For example, when computing device 150 receives a request for coarse location information, computing device 150 may listen for wireless access points. If one or more access points are found, computing device 150 may report the media access control (MAC) address of the AP to trusted server 110, and trusted server 110 may use the MAC address of the AP to determine a coarse location of computing device 150. For example, in some embodiments, trusted server 110 may have access to a database of access points that correlates MAC addresses with AP locations.

Coarse location information may have varying degrees of precision based on the method used. For example, coarse location information derived from the location of antenna site 122 may be on the order of a fraction of a kilometer, whereas coarse location information derived from the location of WLAN AP 130 may be on the order a few hundred meters. In some embodiments, multiple cell sites or multiple APs may be utilized to increase the precision of the coarse location determination.

Trusted server 110 may provide the coarse location of computing device 150 to an individual or entity that is to physically retrieve computing device 150. For example, in some embodiments, the owner may be provided with the coarse location information. Also in some embodiments, law enforcement personnel may be provided with the coarse location information. The owner or law enforcement personnel can then take WLAN monitoring device 160 to a point near computing device 150.

Computing device 150 is then commanded to emit radio signals that can be picked up by WLAN monitoring device 160. In embodiments represented by FIG. 1, the radio emissions are WLAN frames, but this is not a limitation of the present invention. For example, trusted server 110 may send IEEE 802.11v compliant "presence request" frames to computing device 150 through WLAN AP 130, and computing device 150 may transmit "presence response" frames. Also for example, trusted server 110 may simply communicate with computing device 150 through WLAN AP 130, thereby causing computing device 150 to emit WLAN compatible signals.

Armed with the coarse location information, the owner or law enforcement personnel may carry radio (e.g. WWAN or WLAN) monitoring device 160 in the proximity of computing device 150 in an effort to retrieve it. WLAN is a preferred approach since the communication is local in nature. Possible scenarios include driving outside an office building, walking down a corridor of cubicles inside an office building, walking down a hallway within a hotel or apartment complex, or the like.

As described above, WLAN monitoring device 160 may include a directional antenna that allows a person to determine a fine location of computing device 150 with enough precision to physically retrieve it. In some embodiments, WLAN monitoring device 160 may include WLAN interface circuits that enable communications between WLAN monitoring device 160 and computing device 150. In still further embodiments, WLAN monitoring device 160 may include ranging hardware capable of determining a distance between WLAN monitoring device 160 and computing device 150.

Figure 2:
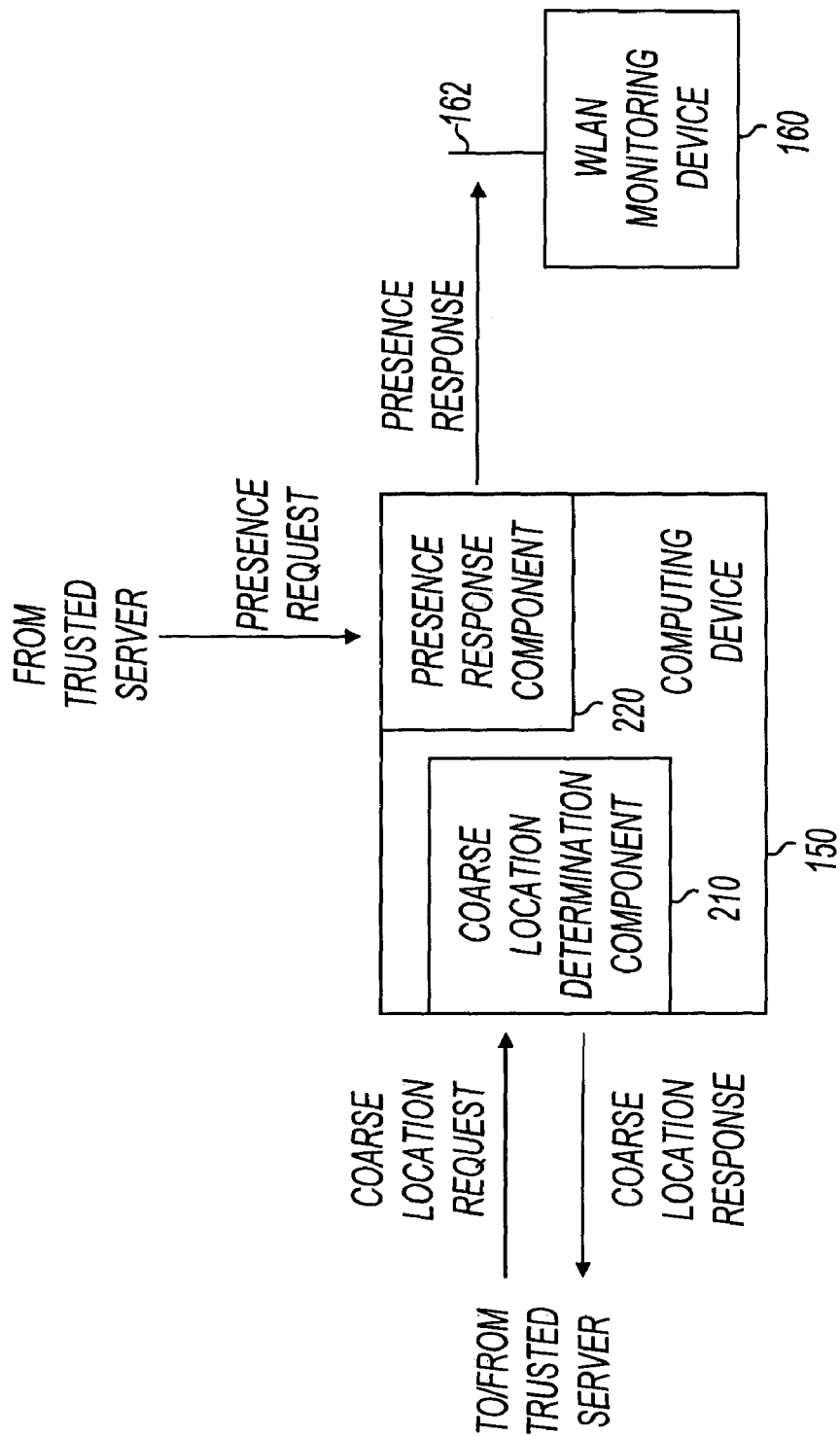
FIG. 2 shows a computing device communicating over a wireless wide area network (WWAN) and a wireless local area network (WLAN)

FIG. 2 shows a computing device communicating over a wireless wide area network (WWAN) and a wireless local area network (WLAN). Computing device 150 corresponds to various embodiments of computing device 150 (FIG. 1), and WLAN monitoring device 160 also corresponds to various embodiments of WLAN monitoring device 160 (FIG. 1).

Computing device 150 includes coarse location determination component 210 and presence response component 220. Coarse location determination component 210 and presence response component 220 may be implemented in hardware, software, or any combination. For example, coarse location determination component may include a WWAN compatible hardware circuit, and may also include software to field requests for coarse location information. Also for example, presence response component 220 may include a WLAN compatible hardware circuit, and may also include software to respond to presence requests.

In operation, computing device 150 may receive a coarse location request from a trusted server such as trusted server 110 (FIG. 1). The coarse location request may be received over a WWAN such as a 3G cellular network or a WiMAX network. Coarse location determination Component 210 may determine a coarse location of computing device 150 using one or more different methods. For example, coarse location determination component 210 may request location information from the WWAN, or may compute its coarse location from information derived from the WWAN. Also, for example, coarse location determination component 210 may retrieve information from a WLAN (such as a MAC address of an access point in range), and may derive location information from the WLAN. Coarse location determination component 210 then provides a coarse location response to the trusted server.

Presence response component 220 fields requests to transmit WAN compatible signals for the purpose of locating computing device 150. In some embodiments, these requests are received from a WLAN AP, such as WLAN AP 130 (FIG. 1). For example, in some embodiments, presence response component 220 operates in compliance with IEEE 802.11v, and produces presence response frames in response to a presence request frame received from the trusted server.

WLAN monitoring device 160 is then utilized to locate computing device 150 so that it may be retrieved. In some embodiments, WLAN monitoring device 160 is "passive," and does not communicate directly with computing device 150 other than to listen for it. In other embodiments, WLAN monitoring device 160 is "active," and participates in bi-directional communications with computing device 150. In still further embodiments, WLAN monitoring device 160 includes ranging hardware.

Figure 3:
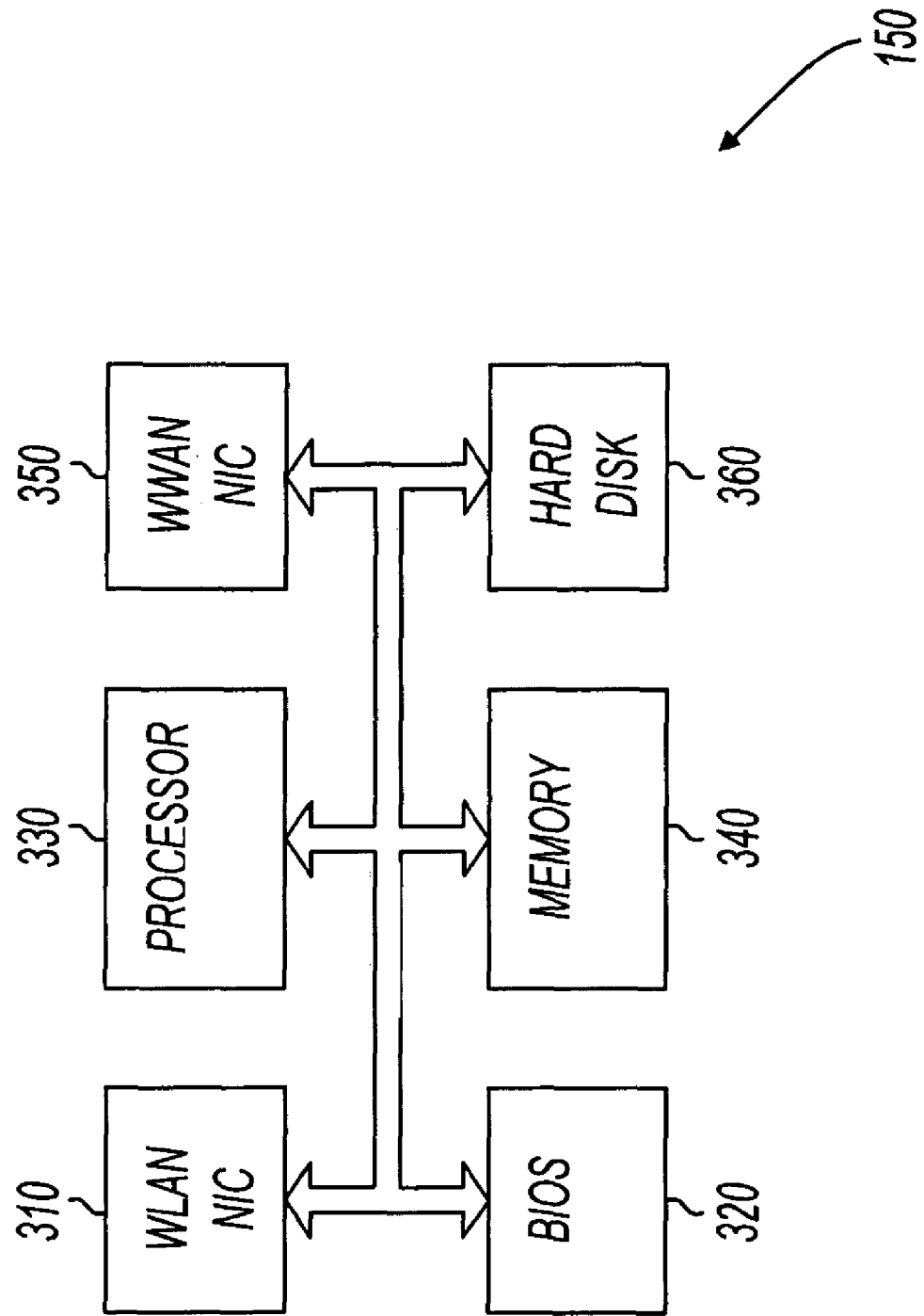
FIG. 3 show a block diagram of an electronic systems in accordance with various embodiments of the present invention.

FIG. 3 show a block diagram of an electronic system in accordance with various embodiments of the present invention. Electronic system 300 may be a computing device to be located, such as computing device 150. Example systems represented by FIG. 3 include desktop computers, laptop computers, cellular phones, personal digital assistants, wireless local area network interfaces, or any other suitable system. Electronic system 300 includes wireless local area network (WLAN) network interface card (NIC) 310, basic input output system (BIOS) 320, processor 330, memory 340, wireless wide area network (WWAN) NIC 350, and hard disk 360.

Processor 330 may be any type of processing device. For example, processor 330 may be a microprocessor, a microcontroller, or the like. Further, processor 330 may include any number of processing cores, or may include any number of separate processors. Further, processor 330 may be formed of dedicated hardware, such as state machines or the like. In some embodiments, processor 330 may perform operations in support of method embodiments of the present invention. For example, processor 330 may perform actions in support of those listed in method 500 (FIG. 5), described below.

Memory 340 may be any type of memory technology. For example, memory 340 may be random access memory (RAM), dynamic random access memory (DRAM), static random access memory (SRAM), non-volatile memory such as FLASH memory, or any other type of memory. Memory 340 may have instructions stored, that when accessed, result in processor 330 performing method embodiments of the present invention.

BIOS 320 includes nonvolatile memory such as FLASH memory. In some embodiments, BIOS 320 includes software that implements portions of coarse location determination component 210 and presence response component 220 (FIG. 2). In these embodiments, electronic system 300 may be located even if a thief has erased the contents of hard disk 360. Coarse location determination component 210 and presence response-component 220 may be executed in place from BIOS 320, or they may be installed on hard disk 360 when electronic system 300 is booted.

WWAN NIC 350 may interoperate with cellular telephone networks, WIMAX networks, or any other wireless wide area network. WWAN NIC 350 may implement all or a part of coarse location determination component 210. For example, WWAN NIC 350 may receive a request for coarse location information, and may provide coarse location information in response.

WLAN NIC 320 may interoperate with a local area network standard, such as IEEE 802.11v. WLAN NIC 310 may implement all or a part of presence response component 220. For example, WLAN NIC 310 may receive a presence request from a trusted server and transmit presence response frames in response.

Various embodiments may be implemented in code and may be stored on a machine-accessible medium, such as a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMS), static random access memories (SRAMs), erasable programmable read-only memories (EPROMs), flash memories, electrically erasable programmable read-only memories (EEPROMs), magnetic or optical cards, or any other type of media suitable for storing electronic instructions.

Figure 4:
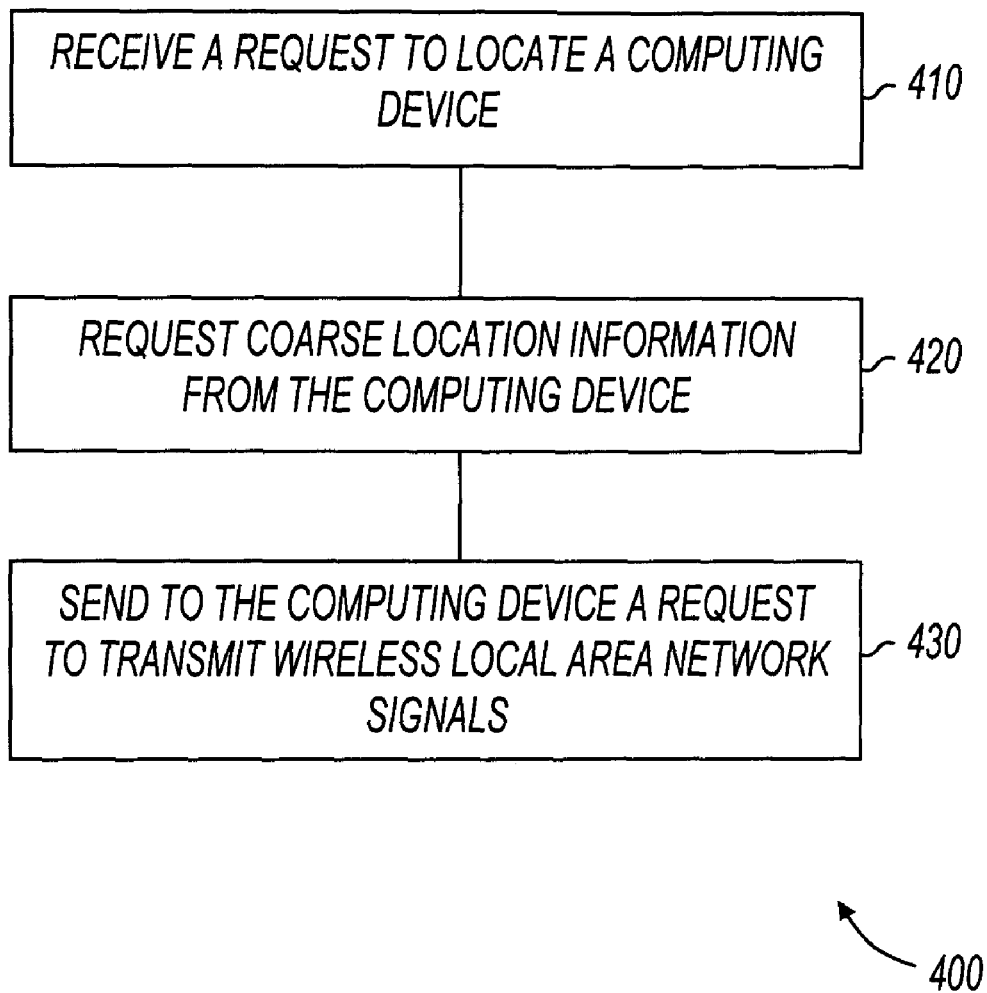
FIGS. 4 and 5 show flowcharts in accordance with various embodiments of the present invention.

FIG. 4 shows a flowchart in accordance with various embodiments of the present invention. In some embodiments, method 400 may be used by a trusted server to locate an electronic system or other computing device. In some embodiments, method 400, or portions thereof, is performed by a trusted server, a processor, or an electronic system, embodiments of which are shown in the various figures. Method 400 is not limited by the particular type of apparatus, software element, or system performing the method. The various actions in method 400 may be performed in the order presented, or may be performed in a different order. Further, in some embodiments, some actions listed in FIG. 4 are omitted from method 400.

Method 400 is shown beginning at block 410 in which a request to locate a computing device is received. At 420, coarse location information is requested from the computing device. In some embodiments, the trusted server requests the coarse information using a WWAN. For example, a request for coarse location information may be made over a cellular network or a WiMAX network. The type of network over which the request is made is not a limitation of the present invention. In some embodiments, the coarse location includes a MAC address of a WLAN AP within range of the computing device to be located. Further, in some embodiments, method 400 includes correlating a WLAN AP MAC address with a coarse location.

At 430, a request to transmit wireless local area network signals is sent. In some embodiments, this request is sent over a WLAN. In some embodiments, an 802.11v presence request frame is sent from a trusted server to the computing device.

Figure 5:
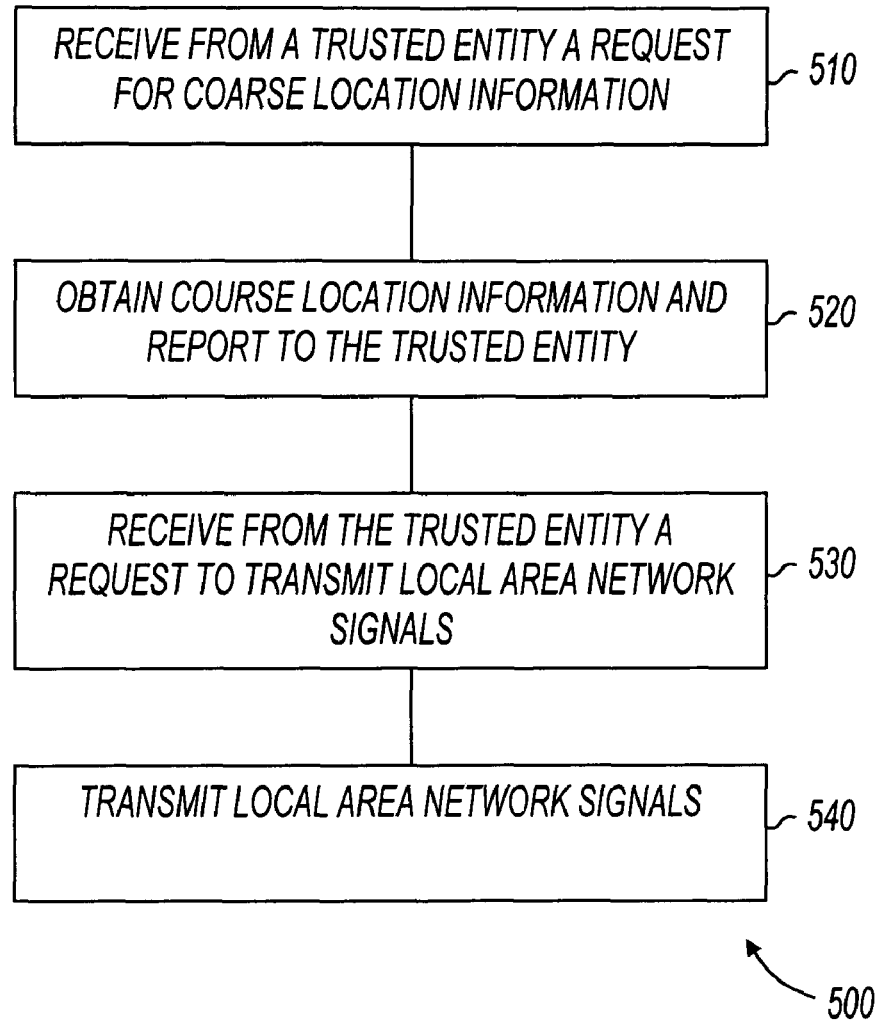

FIG. 5 shows a flowchart in accordance with various embodiments of the present invention. In some embodiments, method 500 may be used by a computing device when communicating with a trusted server. In some embodiments, method 500, or portions thereof, is performed by a computing device, a processor, or an electronic system, embodiments of which are shown in the various figures. Method 500 is not limited by the particular type of apparatus, software element, or system performing the method. The various actions in method 500 may be performed in the order presented, or may be performed in a different order. Further, in some embodiments, some actions listed in FIG. 5 are omitted from method 500.

Method 500 is shown beginning at block 510 in which a request for coarse location information is received from a trusted entity. The trusted entity may be a trusted server, such as trusted server 110 (FIG. 1). The request for coarse location information may be received over a WWAN, such as a cellular telephone network or a WiMAX network.

At 520, coarse location information is obtained and reported to the trusted entity. In some embodiments, coarse location information is obtained using a GPS receiver. In some embodiments, coarse location information is obtained by asking a WWAN provider for the information, and in other embodiments, coarse location information is obtained by asking a WLAN AP for its location, or by retrieving the MAC address of a WLAN AP.

At 530, a request to transmit local area network signals is received from the trusted entity. In some embodiments the request is received over a WWAN, and in other embodiments, the request is received over a WLAN. For example, the request may be received over an 802.11v compliant WLAN, and the request may include a presence request frame. At 540, local area network signals are transmitted. The local area network signals may or may not include 802.11v presence response frames.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method, comprising:
   receiving a request to locate a computing device;
   requesting from a wireless wide area network (WWAN) coarse location information for the computing device in response to the received request to locate the computing device;
   receiving from the WWAN coarse location information that describes a coarse location of the computing device, the received coarse location information being determined by the WWAN;
   identifying a wireless local area network (WLAN) corresponding to the received coarse location information for the computing device;
   sending to the computing device through the identified WLAN a request to transmit wireless WLAN signals; and
   monitoring the wireless WLAN signals transmitted by the computing device in the identified WLAN with a WLAN monitoring device to determine a fine location of the computing device.

2. The method of claim 1, wherein receiving the request to locate the computing device comprises receiving a request to locate a stolen or missing computer.

3. The method of claim 1, wherein sending to the computing device comprises sending a presence request frame to the computing device.

4. The method of claim 3, wherein sending the presence request frame to the computing device comprises sending the frame over the WWAN.

5. The method of claim 3, wherein sending the presence request frame to the computing device comprises sending the frame over the WLAN.

6. The method of claim 2, wherein the WLAN monitoring device comprises a passive monitoring device that does not communicate with the computing device.

7. The method of claim 6, further comprising determining a direction from the WLAN monitoring device to the computing device.

8. The method of claim 6, further comprising determining a distance between the WLAN monitoring device and the computing device.

9. The method of claim 2, wherein sending to the computing device comprises sending a presence request frame to the computing device.

10. The method of claim 9, wherein sending the presence request frame to the computing device comprises sending the frame over the WWAN.

11. The method of claim 9, wherein sending the presence request frame to the computing device comprises sending the frame over the WLAN.

12. The method of claim 9, wherein the WWAN comprises a code division multiple access (CDMA) 2000 network, a wideband CDMA network, or a Worldwide Interoperability for Microwave Access (WiMAX) network, and the WLAN comprises an IEEE 802.11 network.

13. The method of claim 9, further comprising determining a direction from the WLAN monitoring device to the computing device.

14. The method of claim 9, further comprising determining a distance between the WLAN monitoring device and the computing device.

15. The method of claim 1, wherein the WLAN monitoring device comprises a passive monitoring device that does not communicate with the computing device.

16. The method of claim 15, further comprising determining a direction from the WLAN monitoring device to the computing device.

17. The method of claim 15, further comprising determining a distance between the WLAN monitoring device and the computing device.

* * * * *